United States Patent [19]

Serini et al.

[11] Patent Number: 5,041,521

[45] Date of Patent: Aug. 20, 1991

[54] POLYESTER-CARBONATE BASED ON 1,1-BIS-(4-HYDROXYPHENYL)-ALKYLCYCLOALKANES

[75] Inventors: Volker Serini; Dieter Freitag, both of Krefeld-Uerdingen; Ulrich Grigo, Kempen; Uwe Westeppe, Mettmann, all of Fed. Rep. of Germany

[73] Assignee: Bayer Aktiengesellschaft, Leverkusen, Fed. Rep. of Germany

[21] Appl. No.: 472,156

[22] Filed: Jan. 30, 1990

[30] Foreign Application Priority Data

Feb. 2, 1989 [DE] Fed. Rep. of Germany ....... 3903103

[51] Int. Cl.$^5$ ............................................. C08G 63/64
[52] U.S. Cl. .................................... 528/176; 528/193; 528/194; 528/196
[58] Field of Search ................. 528/176, 193, 194, 196

[56] References Cited

U.S. PATENT DOCUMENTS

| | | | |
|---|---|---|---|
| 4,171,421 | 10/1979 | Buxbaum et al. | 528/194 |
| 4,438,241 | 3/1984 | Mark et al. | 525/444 |
| 4,463,160 | 7/1984 | Mark et al. | 528/176 |
| 4,520,187 | 5/1985 | Mark et al. | 528/176 |
| 4,554,309 | 11/1985 | Mark et al. | 524/611 |
| 4,554,330 | 11/1985 | Mark et al. | 528/176 |
| 4,576,996 | 3/1986 | Mark et al. | 525/439 |
| 4,663,434 | 5/1987 | Mark et al. | 568/640 |
| 4,985,532 | 1/1991 | Pakull et al. | 528/176 |

*Primary Examiner*—Harold D. Anderson
*Attorney, Agent, or Firm*—Joseph C. Gil; Richard E. L. Henderson

[57] ABSTRACT

Polyesters and polyester-carbonates based on dihydroxydiphenylcycloalkanes corresponding to the following general formula:

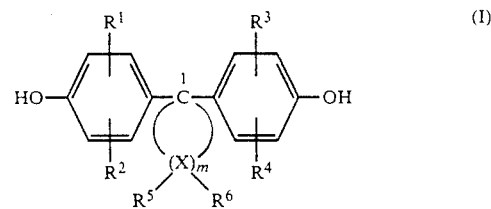

wherein
$R^1$, $R^2$, $R^3$ and $R^4$ independently represent hydrogen, a $C_1$–$C_{12}$ hydrocarbon radical or halogen; m represents an integer of from 4 to 7,
$R^5$, and $R^6$, may be selected individually for each X and independently represent hydrogen or $C_1$–$C_6$ alkyl; and
X represents carbon;
with the proviso that, on at least one atom X, $R^5$ and $R^6$ simultaneously represent alkyl.

1 Claim, No Drawings

POLYESTER-CARBONATE BASED ON 1,1-BIS-(4-HYDROXYPHENYL)-ALKYLCYCLOALKANES

This invention relates to polyesters and polyester-carbonates based on (a) aromatic diphenols, ($b_1$) aliphatic, and/or cycloaliphatic and/or aromatic dicarboxylic acids; and, optionally, ($b_2$) carbonic acid, containing ($b_1$) in an amount of from 0.1 to 100 mol % and, optionally ($b_2$) in an amount of from 0 to 99.9 mol %, based on ($b_1$)+($b_2$), which are characterized in that (a) consists to the extent of from 0.1 to 100 mol % of diphenols corresponding to the following general formula:

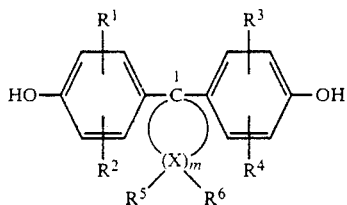

wherein $R^1$, $R^2$, $R^3$ and $R^4$ independently represent hydrogen, a $C_1$-$C_{12}$ hydrocarbon radical or halogen; m represents an integer of from 4 to 7, $R^5$ and $R^6$, which may be selected individually for each X, independently represent hydrogen or $C_1$-$C_6$ alkyl; and X represents carbon; with the proviso that, on at least one atom X, $R^5$ and $R^6$ simultaneously represent alkyl.

The polyesters and polyester-carbonates according to the present invention have surprisingly good properties, which are of great importance for industry, in comparison with known polyesters and polyester-carbonates, such as e.g. in comparison with those of bisphenol A and 1,1-bis-(4-hydroxyphenyl)-cyclohexane.

They thus have, even with only small portions of co-condensed bisphenols (I), surprisingly high glass transition temperatures $T_g$. They moreover exhibit, even at only small contents of co-condensed bisphenols (I), particularly good mould release properties.

They additionally exhibit exceptionally good impact strength, notched impact strength and melt flow capacity, taking into account the high glass transition temperature $T_g$. The present polyesters and polyester-carbonates are also particularly resistant to tracking, stable to hydrolysis and insensitive towards stress cracking, thus, in particular, also in contact with fuels and oils. The low tendency thereof towards crystallization is also surprising.

In general formula (I), $R^1$, $R^2$, $R^3$ and $R^4$ preferably represent hydrogen, methyl, ethyl, phenyl, cyclohexyl, chloro or bromo, more preferably hydrogen, methyl or bromo. If more than one of the radicals $R^1$, $R^2$, $R^3$ and $R^4$ represent other than hydrogen, the same substituents are preferred. If two of the radicals $R^1$, $R^2$, $R^3$ and $R^4$ represent other than hydrogen, o,o'-substitution with respect to the phenolic OH groups in general formula (I) is preferred. If all four radicals $R^1$, $R^2$, $R^3$ and $R^4$ present other than hydrogen, o,o,o'o'-substitution, as above, is preferred.

In general formula (I), m preferably represents 4 or 5, most preferably 5.

Furthermore, in general formula (I), $R^5$ and $R^6$ preferably simultaneously represent alkyl on 1 or 2 atoms X, in particular only on one atom X. The preferred alkyl radical is methyl; the X atoms in the α-position relative to the diphenyl-substituted carbon atom (C-1) are preferably not dialkyl-substituted, while alkyldisubstitution in the β-position relative to C-1 is preferred.

Bisphenols (I) which may be employed according to the present invention are e.g.:

1,1-bis-(4-hydroxyphenyl)-3,3-dimethyl-5-methylcyclohexane, 1,1-bis-(4-hydroxyphenyl)-3,3-dimethyl-5,5-dimethylcyclohexane, 1,1-bis-(4-hydroxyphenyl)-3,3-dimethyl-4-methylcyclohexane 1,1-bis-(4-hydroxyphenyl)-3,3-dimethyl-5-ethylcyclohexane, 1,1-bis-(4-hydroxyphenyl)-3,3-dimethyl-5-methylcyclopentane, 1,1-bis-(3,5-dimethyl-4-hydroxyphenyl)-3,3-dimethyl-5-methyl-cyclohexane, 1,1-bis-(3,5-diphenyl-4-hydroxyphenyl)-3,3-dimethyl-5-methyl-cyclohexane, 1,1-bis-(3-methyl-4-hydroxyphenyl)-3,3-dimethyl-5-methylcyclohexane, 1,1-bis-(3-phenyl-4-hydroxyphenyl)-3,3-dimethyl-5-methylcyclohexane, 1,1-bis-(3,5-dichloro-4-hydroxyphenyl)-3,3-dimethyl-5-methyl-cyclohexane and 1,1-bis-(3,5-dibromo-4-hydroxyphenyl)-3,3-dimethyl-5-methyl-cyclohexane.

1,1-bis-(4-hydroxyphenyl)-3,3-dimethyl-5-methyl-cyclohexane is particularly preferred.

The dihydroxy diphenyl cycloalkanes (I) according to the present invention may be prepared in a known manner by condensation of phenols corresponding to the following general formula (II) and,,or (III):

and ketones corresponding to the following general formula (IV):

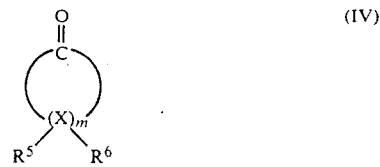

wherein, in general formulae (II), (III) and (IV), X, $R^1$, $R^2$, $R^3$, $R^4$, $R^5$, $R^6$ and m are as defined in connection with general formula (I).

The dihydroxy diphenyl cycloalkanes (I) according to the present invention in which some or all of $R^1$, $R^2$, $R^3$ and $R^4$ represent halogen may also be obtained, at least in some cases, by halogenation of the corresponding unsubstituted dihydroxy diphenyl cycloalkanes. Thus, for example, 1,1-bis-(4-hydroxyphenyl)-3,3-dimethyl-5-methylcyclohexane may be reacted by nuclear chlorination or nuclear bromination by known methods to give 1,1-bis-(3,5-dichloro-4-hydroxyphenyl)-3,3-dimethyl-5-methyl-cyclohexane or 1,1-bis-(3,5-dibromo-4-hydroxyphenyl)-3,3-dimethyl-5-methyl-cyclohexane.

Diphenols (I) and the preparation thereof are described in more detail in German Patent Application P 38 32 396.6.

Examples of aromatic diphenols (component (a)) which may be used in addition to those corresponding to general formula (I) for building-up the present polyesters and polyester carbonates are: hydroquinone, resorcinol, dihydroxy diphenyls, bis-(hydroxyphenyl)alkanes, bis-(hydroxyphenyl)-cycloalkanes, bis-(hydroxyphenyl) sulphides, bis-(hydroxyphenyl) ethers, bis-(hydroxyphenyl)ketones, bis-(hydroxyphenyl) sulphones, $\alpha,\alpha'$-bis-(hydroxyphenyl)-isopropylbenzenes, pentamethyl(hydroxyphenyl)-indanols and corresponding nuclearsubstituted compounds.

These and other suitable aromatic dihydroxy compounds are described, e.g. in Hermann Schnell, "Chemistry and Physics of Polycarbonates", Polymer Reviews 9, Interscience Publishers, New York 1964; in V. Serini, D. Freitag and H. Vernaleken, "Polycarbonate aus o,o,o',o'-tetramethylsubstituierten Bis-phenolen (Polycarbonates from o,o,o',o'-tetramethyl-substituted bisphenols)", Angewandte Makromolekulare Chemie 55 (1976) 175–189, in U.S. Pat. Nos. 3,028,365; 2,999,835; 3,148,172; 3,271,368; 2,991,273; 3,271,367; 3,780,078; 3,014,891 and 2,999,846, in DT-OS 1,570,703; 2,063,050; 2,063,052; 2,211,957; 2,402,175; 2,402,176 and 2,402,177 and in FR-PS 1,561,518.

Preferred diphenols are: hydroquinone, bis-(4-hydroxyphenyl), 2,2-bis-(4-hydroxyphenyl)-propane, bis-(4-hydroxyphenyl) sulphide, bis-(4-hydroxyphenyl) ether, bis-(4-hydroxyphenyl) ketone, bis-(4-hydroxyphenyl) sulphone, bis-(4-hydroxyphenyl)-methane, 1,1-bis-(4-hydroxyphenyl)-cyclohexane, $\alpha,\alpha'$-bis(4-hydroxyphenyl)-p-diisopropylbenzene, 1,1-bis-(4-hydroxyphenyl)-1-phenyl-ethane, 2,2-bis-(3-methyl-4-hydroxyphenyl)-propane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)methane, 2,2-bis-(3,5-dimethyl-4-hydroxyphenyl)-butane, bis-(3,5-dimethyl-4-hydroxyphenyl) and 1,1,3,4,6-pentamethyl-3-(3,5-dimethyl-4-hydroxyphenyl)-indan-5-ol, more preferably bis-(4-hydroxyphenyl), 2,2-bis-(4-hydroxyphenyl)-propane and 2,2-bis-(3,5-dimethyl-4-hydroxyphenyl)-propane, and most preferably 2,2-bis-(4-hydroxyprophenyl)-propane.

Examples of aliphatic, cycloaliphatic and aromatic dicarboxylic acids (component (b) which are suitable for building-up the polyesters and polyester carbonates according to the present invention are: oxalic acid, malonic acid, succinic acid, glutaric acid, adipic acid, pimelic acid, suberic acid, azelaic acid, sebacic acid, nonane dicarboxylic acid, decane dicarboxylic acid, dodecane dicarboxylic acid, octadecane dicarboxylic acid, dimethyl malonic acid, dimeric sebacic acid, 1,4-cyclo-hexane dicarboxylic acid, tetrahydroterephthalic acid, tetrahydroisophthalic acid, tetrahydrophthalic acid, 3,6-endomethylene tetrahydrophthalic acid, o-, m- and p-phenylene diacetic acid, orthophthalic acid, terephthalic acid, isophthalic acid, t-butylisophthalic acid, 3,3'-diphenyl dicarboxylic acid, 4,4'-diphenyl dicarboxylic acid, 4,4'-benzophenone dicarboxylic acid, 3,4'-benzophenone dicarboxylic acid, 4,4'-diphenyl ether dicarboxylic acid, 4,4'-diphenyl sulphone dicarboxylic acid, 2,2-bis-(4-carboxyphenyl)-propane and trimethyl-3-phenylindane-4,5-dicarboxylic acid.

The polyesters and polyester carbonates according to the present invention are preferably prepared from aromalic dicarboxylic acids. Of the aromatic dicarboxylic acids, terephthalic scid and/or isophthalic acid are particularly preferred. Terephthalic acid is especially preferred.

The polyesters and polyester-carbonates according to the present invention wherein the aromatic diphenols (component (a)) comprise to the extent of from 1 to 100 mol %, preferably from 5 to 100 mol % and more preferably from 10 to 100 mol %, of diphenols (I) are preferred. Of the polyesters and polyester-carbonates wherein the aromatic diphenols (component (a)) comprise to the extent of from 10 to 100 mol % of those corresponding to general formula (I), those containing from 10 to 50 mol % and from 55 to 100 mol % of aromatic diphenols (I) are preferred, those containing from 10 to 40 mol % and from 70 to 100 mol % of aromatic diphenols (I) are more preferred, those containing from 15 to 35 mol % and from 85 to 100 mol % of aromatic diphenols (I) are especially preferred and those containing 100 mol % of aromatic diphenols (I) are particularly preferred.

The polyester-carbonates which contain the dicarboxylic acids, component ($b^1$), in an amount of from 5 to 98 mol %, preferably from 15 to 95 mol %, more preferably from 20 to 50 mol % and from 60 to 95 mol % and in particular from 25 to 45 mol % and from 80 to 95 mol %, based on the sum of the dicarboxylic acids (component ($b^1$)) and the carbonic acid (component ($b_2$)), are preferred.

The polyesters and polyester-carbonates according to the present invention may be prepared by processes such as are known from the literature for preparation of polyesters and polyester-carbonates, thus e.g. by processes in homogeneous solution, by melt transesterification processes and by the two-phase interface process. Melt transesterification processes and, in particular, the twophase interface process are preferably used.

Processes for the preparation of polyesters and polyester-carbonates in homogeneous solution are described, for example, in the patent specifications DOS 1,420,475, U.S. Pat. Nos. 3,169,121 and 4,156,069 and in the monograph Polymer Reviews, volume 10, Condensation Polymers by Interfacial and Solution Methods, Paul W. Morgan, Interscience Publishers New York 1965, chap. VIII, p.325 et seq., Polyesters. Thus, for example, polyesters may be prepared by reaction of dicarboxylic acid dichlorides with aromatic dihydroxy compounds in the presence of pyridine as an acid acceptor and pyridine or chlorinated hydrocarbons, such as methylene chloride and chlorobenzene, as solvents.

Polyester-carbonates may likewise be prepared, for example, in homogeneous solution by employing phosgene, the dicarboxylic acid and the aromatic dihydroxy compound, or phosgene, the dicarboxylic acid dichloride and the aromatic dihydroxy compound as monomers. The reaction already proceeds sufficiently rapidly at low temperatures, thus e.g. at from 10° to 40° C.

Melt transesterification processes for the preparation of polyesters and polyester-carbonates are, for example, the acetate process and phenyl ester process.

The acetate process is described, for example, in the patent specifications U.S. Pat. Nos. 3,494,885 and 4,386,186 and EP 26 120, 26 121, 26 684, 28 030, 39 845, 91 602 and 97 970, in the monograph Polyesters, V. V. Korshak and S. V. Vinograda, Pergamon Press, Oxford, 1965, and in the publication by V. V. Korshak and S. V. Vinograda, Chemical Fibre Symp., Abh. d. Akad. Wiss. Berlin, 1, (1963), 355 et seq. In this process, bisacetates of aromatic dihydroxy compounds, such as bisphenol A diacetate, are in general reacted with dicarboxylic acids, e.g. aromatic dicarboxylic acids, such as isophthalic acid and terephthalic acid, in the melt at temperatures of from 200° to 400° C., acetic acid being split off, to give aromatic polyesters. Auxiliary solvents, such as e.g. diphenyl ether, substituted cyclohexanes and decahydronaphthalene, may be used here to improve the melt flow capacity of the polyester during the process and to prevent sublimation of the dicarboxylic acid.

If appropriate, the reaction may be catalysed, such as with alkali metal and alkaline earth metal compounds, Ti compounds, Zn compounds, Sn compounds, Sb compounds and Mn compounds. The condensation reaction may also be carried out, especially in the case of polyesters which crystallize, so that the condensation reaction is not carried out to the end in the melt, but the condensation takes place in the melt only until the formation of a prepolymer which still flows readily, which is then subjected to a solid phase condensation below its melting point until the desired degree of condensation is reached. In this case, the further build-up of the polymer is brought to completion at only slightly below the polymer melting point under reduced pressure, acetic acid being further split off and removed.

The phenyl ester process for the preparation of aromatic polyesters and polyester-carbonates is described, for example, in the patent specifications U.S. Pat. Nos. 4,661,580; 4,680,371 and 4,680,372, EP 79 075, 146 887, 156 103, 234 913, 234 914 and 240 301 and DAS 1,495,626 and 2,232,877. In this process, aromatic dihydroxy compounds, such as bisphenol A, are in general reacted with aromatic dicarboxylic acid esters, such as e.g. diphenyl isophthalate and diphenyl terephthalate, in the melt at temperatures of from 200° to 400° C., phenol being split off, to give aromatic polyesters. Aromatic dihydroxy compounds, dicarboxylic acids and diesters of carbonic acid, such as diphenyl carbonate, may also be reacted as starting substances for the preparation of polyesters by this process. In this case, the dicarboxylic acid phenyl esters required for the reaction are formed intermediately, $CO_2$ and phenol being split off.

In addition to the diesters of the dicarboxylic acids, diesters of carbonic acid, such as diphenyl carbonate, are in general used for the preparation of polyester-carbonates by the phenyl ester process. However, it is also possible to use only aromatic dihydroxy compounds, dicarboxylic acids and diphenyl carbonate for the polyester-carbonate preparation. In the case of polyester-carbonate preparation, the sum of diesters of dicarboxylic acids and dicarboxylic acids employed is in general less than the sum of bisphenols employed, in all cases based on molar parts. As has already been described for the acetate process, in the phenyl ester process catalysts may also be used to accelerate the condensation reaction, auxiliaries may be employed and a solid phase condensation of the prepolymer may be carried out. The catalysts and auxiliary solvents may be the same as those which have already been described for the acetate process.

The two-phase interface process for the preparation of polyesters and polyester-carbonates is described, for example, in the patent specifications EP 68 014, 88 322, 134 898, 151 750, 182 189, 219 708 and 272 426 and DOS 2,940,024; 3,007,934 and 3,440,020, and in the monograph Polymer Reviews, volume 10, Condensation Polymers by Interfacial and Solution Methods, Paul W. Morgan, Interscience Publishers New York 1965, chap. VIII, p.325, Polyesters.

Aromatic dihydroxy compounds, dicarboxylic acid dichlorides and phosgene are preferably used as starting components for the preparation of the polyesters and polyester-carbonates according to the present invention by the two phase interface process.

It also possible to use terephthalic acid and/or isophthalic acid in the two-phase interface process, dicarboxylic acid chlorides or dichlorides being intermediately formed with the aid of phosgene.

In the two-phase interface process, the polycondensation is carried out in a two-phase system of aqueous alkaline solution and water-immiscible organic solvent. For example, the aromatic dihydroxy compound is dissolved as the diphenolate in aqueous alkali and reacted with the dicarboxylic acid dichloride and, if appropriate, phosgene, dissolved in the organic solvent, while stirring. The polyester and polyester-carbonate which form are dissolved in the organic solvent. If a dicarboxylic acid dichloride and phosgene are employed, that is to say if polyester-carbonates are being prepared, the dicarboxylic acid dichloride and the phosgene may be employed in a different manner. Thus, for example, it is possible first to react only the dicarboxylic acid chloride with the alkali metal bisphenolate and only then to add the phosgene required for bringing the polycondensation to completion. It is also possible, for example, for the dicarboxylic acid dichloride and some of the phenol required to be reacted together with the bisphenolate and for the remainder of the total amount of phosgene required then to be added. The polycondensation is in general carried out with the aid of catalysis. The catalyst, which is described in more detail below, may be added, for example, when the dicarboxylic acid dichlorides and the phosgene have already reacted with the alkali metal bisphenolate for a certain time. However, it may also be employed, at least in part, right at the start of the reaction. It is also possible, however, for different catalysts to be used in one condensation reaction, in which case the time of addition of the individual catalysts may vary. The polycondensation is in general carried out in the presence of chain-limiters in order to establish certain molecular weights. To achieve certain properties, thus e.g. structural viscosity, it is also possible to employ, for example, branching agents. Antioxidants may also be employed in the reaction, e.g. in order to achieve very light-coloured polycondensates.

Examples of water-immiscible organic solvents which may be employed are chlorinated hydrocarbons, such as chloroform, dichloroethane, tri- and tetrachloroethylene, tetrachloroethane, methylene chloride, chlorobenzene and dichlorobenzene, and also non-chlorinated hydrocarbons, such as toluene and xylene.

Chlorobenzene or methylene chloride or mixtures of the two are preferably used.

Compounds such as are known from polycarbonates, polyesters and polyester-carbonates are employed as chain stoppers, thus e.g. secondary amines, phenols and acid chlorides. Phenols are particularly preferred, such as phenol and alkylphenol, and particularly preferably those having $C_1$-$C_{12}$ alkyl groups, such as p-t-butylphenol, m- and p3,5-dimethyl-heptyl-phenol and m- and p-1,1,3,3-tetramethylbutylphenol, as well as hydroxydiphenyl and p-cumenylphenol. p-1,1,3,3,-tetramethylbutylphenol (p-isooctylphenol) is especially preferably employed.

Small amounts, preferably amounts of from 0.05 to 3.00 mol % (based on the diphenols employed), of compounds which are trifunctional or more than trifunctional, in particular those having three or more than three phenolic hydroxyl groups, serve in a known manner as branching agents, if used, in order to obtain branched polyesters or polyester-carbonates. Some of the compounds having three or more than three phenolic hydroxyl groups which may be used are:

phloroglucinol
4,6-dimethyl-2,4,6-tri-(4-hydroxyphenyl)-hept-2-ene,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-(4,4-bis-(4-hydroxyphenyl)-cyclohexyl)-propane,
2,4-bis-(4-hydroxyphenyl-isopropyl)-phenol,
2,6-bis-(2-hydroxy-5′-methyl-benzyl)-4-methylphenol,
2-(4-hydroxyphenyl)-2-(2,4-dihydroxyphenyl)-propane,
hexa-(4-(4-hydroxyphenyl-isopropyl)-phenyl) orthoterephthalate,
tetra-(4-hydroxyphenyl)-methane,
tetra-(4-(4-hydroxyphenyl-isopropyl)-phenoxy)-methane and
1,4-bis-((4′,4″-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Catalysts which may be employed are tertiary amines and/or phase transfer catalysts, such as quaternary ammonium and phosphonium compounds and/or crown ethers. Examples of preferred catalysts are N-ethylpiperidine, tetrabutyl ammonium bromide and/or triphenylbenzyl phosphonium bromide.

Generally the polyesters and polyester-carbonates according to the present invention have average molecular weights $\overline{M}w$ of at least 10,000, preferably from 10,000 to 250,000 and more preferably from 15,000 to 80,000.

The present polyesters and polyester-carbonates may also contain dyestuffs, pigments, stabilizers, flameproofing agents, fillers and reinforcing substances, such as glass fibres, or carbon fibres or other auxiliaries mixed into the polymers. The most favourable amount in a particular case depends on the particular intended use.

The polyesters and polyester-carbonates according to the present invention may be used for the production of shaped articles, fibres, filaments and films.

Because of the high heat resistance, toughness, stability towards hydrolysis, creep resistance and absence of susceptibility to stress cracking thereof, they are particularly suitable for use in the electrical sector, in particular at high temperatures, and furthermore in the illumination sector and for fittings in automobile engine compartments. Electrical insulators, such as lamp mountings, reflectors for lights and mountings in the engine compartment, may therefore advantageously be produced therefrom.

EXAMPLE 1-Polyester 90 g NaOH (2.25 mol), 1.3 g N-ethylpiperidine (0.01 mol) and 310 g 1,1-bis-(4-hydroxyphenyl)-3,3,5-trimethyl-cyclohexane (1 mol) were dissolved in 4,400 g water, while stirring. 4,000 g methylene chloride containing 5.36 g p-(1,1,3,3-tetramethylbutyl)-phenol (0.026 mol) and 205.6 g isophthaloyl dichloride (1,013 mol) in dissolved form, were added, while stirring was continued. Stirring was then continued for a further hour. The temperature was maintained at from 20° to 35° C. The organic phase was then separated off and the biphenolate-free aqueous alkaline phase was discarded. The organic phase was washed with dilute aqueous phosphoric acid and then several times with distilled water, until it was free from electrolytes. A colourless polyester was obtained by evaporating off the methylene chloride from the organic phase, and was freed from residual traces of methylene chloride at 130° C. in vacuo for a further 15 hours. Measurement of the relative viscosity of the polyester gave a value of $\eta_{rel}=1.313$ (measured on a methylene chloride solution at 25° C., c=5 g/l solution). Differential thermal analysis gave a value for the glass transition temperature of the polyester of $T_g=256°$ C.

EXAMPLE 2- Polyester-carbonate 82 g NaOH (2.05 mol) and 310 g 1,1,-bis-(4-hydroxyphenyl)-3,3,5-trimethyl-cyclohexane (1 mol) were dissolved in 4,300 g water, while stirring. 3,900 g methylene chloride, containing 5.36 g p-(1,1,3,3-tetramethylbutyl)-phenol and 182.7 g isophthaloyl dichloride (0.9 mol) in dissolved form, were added, while stirring was continued. After a stirring time of half an hour, a further 64 g NaOH (1.6 mol) were added as a 50% aqueous solution. 29.7 g phosgene (0.3 mol) was introduced in gaseous form into the reaction mixture, while stirring was continued. After the phosgene had been introduced, 1.13 g N-ethyl piperidine (0.01 mol) were added and the mixture was subsequently stirred for a further hour. Throughout the entire period, the temperature was maintained at from 20° to 35° C. Working-up of the reaction mixture was carried out as described in Example 1. Here also, the aqueous alkaline phase was free from bisphenolate. The isolated and dried polyester-carbonate showed the following values: $\eta_{rel}=1.300$, $T_g=252°$ C. (both values measured as described in Example 1).

EXAMPLES 3-6-Polyesters

Four further polyesters were prepared in the manner described in Example 1, only the starting substances listed in the Table being varied, as shown therein. The values for the relative viscosity, $\eta_{rel}$, and the glass transition temperature, $T_g$, measured on the resulting polyesters are contained in the Table.

EXAMPLES 7-9-Polyester-carbonates

Three further polyester-carbonates were prepared in the manner described in Example 2, only the starting substances listed in the Table being varied, as shown therein. The values for the relative viscosity $\eta_{rel}$ and the glass transition temperature $T_g$ measured on the resulting polymers are contained in the Table.

TABLE

| Example | Polyesters (examples 3-5) and polyester-carbonates (examples 6-8) | | | | | | |
|---|---|---|---|---|---|---|---|
| | Starting substances in mol | | | | | $\eta_{rel}$ | $T_g$ (°C.) |
| | BPTMC | BPA | TER | ISO | COCl$_2$ | | |
| 3 | 0.50 | 0.50 | 1.013 | — | — | 1.298 | 262 |
| 4 | 1.00 | — | 0.513 | 0.500 | — | 1.287 | 286 |
| 5 | 0.25 | 0.75 | 1.013 | — | — | 1.305 | 236 |
| 6 | 1.00 | — | 1.013 | — | — | 1.325 | 303 |
| 7 | 1.00 | — | 0.81 | 0.09 | 0.30 | 1.290 | 299 |
| 8 | 0.25 | 0.75 | 0.25 | — | 0.95 | 1.311 | 187 |
| 9 | 0.25 | 0.75 | 0.25 | 0.25 | 0.70 | 1.335 | 197 |

BPTMC = 1,1-bis-(4-hydroxyphenyl)-3,3,5-trimethyl-cyclohexane,
BPA = bisphenol A.
TER = terephthaloyl dichloride.
ISO = isophthaloyl dichloride.
$\eta_{rel}$ = relative viscosity, measured as in Example 1.
$T_g$ = glass transition temperature of the resulting polyester or polyester-carbonate from differential thermal analysis

We claim:
1. A polyester-carbonate based on
(a) at least one aromatic diphenol;
(b$_1$) at least one aliphatic, cycloaliphatic, or aromatic dicarboxylic acid; and
(b$_2$) carbonic acid; wherein said polyester-carbonate contains structural units from component (b$_1$) in an amount of from 5 to 98 mol % and from component (b$_2$) in an amount of from 2 to 95 mol %, based on the total molar amount of components (b$_1$) and (b$_2$), and wherein from 0.1 to 100 mol % of component (a) is an aromatic diphenol corresponding to the formula

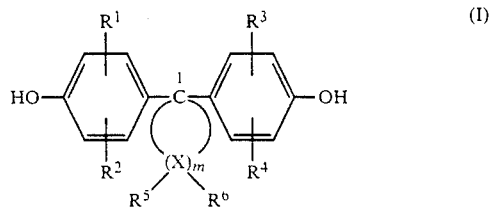

wherein
R$^1$, R$^2$, R$^3$, and R$^4$ independently represent hydrogen, a C$_1$–C$_{12}$ hydrocarbon group, or halogen;
m is 4 or 5;
R$^5$ and R$^6$ are individually selected for each X and independently represent hydrogen or C$_1$–C$_6$ alkyl and
X represents a carbon atoms,
with the proviso that, on at least one X, both R$^5$ and R$^6$ are simultaneously C$_1$–C$_6$ alkyl.

* * * * *